United States Patent Office 3,749,797
Patented July 31, 1973

3,749,797
ANALGESIC COMPOSITIONS
Joseph A. Miller, Jr., Indianapolis, Ind., assignor to Eli Lilly and Company, Indianapolis, Ind.
No Drawing. Continuation-in-part of abandoned application Ser. No. 831,699, June 9, 1969. This application July 2, 1971, Ser. No. 159,564
Int. Cl. A61k 27/00
U.S. Cl. 424—308
6 Claims

ABSTRACT OF THE DISCLOSURE

Improved analgesic compositions comprising, in combination, α-d-1,2-diphenyl - 2 - propionyloxy-3-methyl-4-dimethylaminobutane (α-d-propoxyphene), or a pharmaceutically acceptable acid addition salt thereof, and namoxyrate; and methods of employing such improved analgesic compositions to obtain enhanced analgesia.

CROSS-REFERENCE TO RELATED APPLICATION

This is a continuation-in-part of my copending application Ser. No. 831,699, filed June 9, 1969 and abandoned after the filing of this application.

BACKGROUND OF THE INVENTION

This invention relates to analgesic compositions, and more particularly relates to improved analgesic compositions demonstrating enhanced activity. It is known that certain esters of 1,2-diphenyl-2-hydroxy-3-methyl-4-(substituted)aminobutanes and their pharmaceutically acceptable salts are effective analgesic agents. (See U.S. Pat. No. 2,728,779, issued Dec. 27, 1955.) Included among such esters is α-d-1,2,-diphenyl-2-propionyloxy-3-methyl-4-dimethylaminobutane, which is commonly known as and hereinafter referred to as α-d-propoxyphene. α-d-Propoxyphene has been extensively used for the relief of pain, typically as the hydrochloride salt. It is a non-addicting analgesic and, therefore, is greatly preferred over narcotic analgesic agents such as morphine. However, α-d-propoxyphene is not as potent an analgesic agent as is morphine and thus, for effective relief of severe pain, morphine or other narcotic analgesic agents must be administered. Thus, there has continued to exist a longstanding need for non-narcotic analgesic compositions approaching the potency of morphine. It is a primary object of this invention to provide such analgesic compositions.

Namoxyrate has been reported to be an analgesic agent by Cohen et al., "Double Blind Evaluation of Namoxyrate, Codeine, Aspirin, and Placebo," J. of New Drugs, 5, 153–161 (1965), with an optimal daily dose of about 1200 mg., given in 300 mg. capsules four times daily.

SUMMARY OF THE INVENTION

The invention provides analgesic compositions and methods of employing such compositions to relieve pain. It has been found that the level of analgesia obtained with α-d-propoxyphene can be enhanced to that of the more potent, but narcotic, analgesic agents. Such a result can be achieved by combining α-d-propoxyphene, or a pharmaceutically acceptable acid addition salt thereof, with namoxyrate, identified chemically as the 2-(4-biphenylyl)butyric acid salt of 2-dimethylaminoethanol.

DETAILED DESCRIPTION OF THE INVENTION

In general, the practice of the present invention is in accordance with the practices for utilization of α-d-propoxyphene and namoxyrate, individually.

Current practice with respect to the administration of α,d-propoxyphene is described in Physicians Desk Reference to Pharmaceutical Specialties and Biologicals (for example, 23rd edition, published 1969, by Medical Economics, Inc., subsidiary of Litten Publications, Inc., Oradell, N.J. (pp. 818–819)). The utilization of namoxyrate is described in U.S. Pat. No. 3,181,994.

α-d-Propoxyphene can be employed as the free base or as one of its pharmaceutically acceptable acid addition salts. Such salts are readily prepared by reacting the free amine with an organic or inorganic acid. Representative salts include the hydrochloride, hydrobromide, sulfate, bisulfate, acetate, valerate, oleate, phenate, laurate, borate, benzoate, lactate, phosphate, tosylate, citrate, maleate, fumarate, succinate, tartrate, napsylate (salt of 2-naphthalenesulfonic acid), and the like. In the following teaching, the term "α-d-propoxyphene" is used to refer to the foregoing compound either as the free base or as a pharmaceutically acceptable acid addition salt thereof.

In general, the amounts of α-d-propoxyphene and namoxyrate to be employed in the practice of the present invention can be determined by reference to dosages of the substances employed when each is administered individually. By virtue of the potentiating effect of namoxyrate, α-d-propoxyphene can be used in smaller dosages than is normally required. However, it is preferred to employ the usual dosages of α-d-propoxyphene in order to obtain a more pronounced analgesic effect than is otherwise obtainable so that the novel analgesic compositions can be used to relieve extremely severe pain.

Good results in accordance with the present invention have been achieved when employing α-d-propoxyphene and namoxyrate in amounts representing a ratio of one part by weight, as the free base, of α,d-propoxyphene or a pharmaceutically acceptable acid addition salt thereof and from 1 to 25 parts by weight of namoxyrate.

In carrying out the practice of this invention, it is generally preferred to administer the α-d-propoxyphene and namoxyrate together, as part of a composition which may contain one or more pharmaceutically acceptable adjuvants. The particular form of composition will vary with the particular route of administration. Solid dosage forms for oral administration include filled capsules, tablets, pills, powders, and granules. In such solid dosage forms, the active compounds are generally admixed with at least one inert diluent such as sucrose, lactose, or starch. The compositions may also comprise, as is normal practice, additional substances other than inert diluents, e.g., lubricating agents such as magnesium stearate.

Liquid dosage forms for oral administration include pharmaceutically acceptable emulsions, solutions, suspensions, syrups, and elixirs containing inert diluents commonly used in the art, such as water. Besides inert diluents, such compositions may also comprise adjuvants, such as wetting, emulsifying, and suspending agents, and sweetening, flavoring, and performing agents.

Compositions for rectal administration are suppositories which may contain, in addition to the active substances, excipients such as cocoa butter or a suppository wax.

For reasons of convenience in administration, filled capsules are the preferred therapeutic dosage form. Such filled capsules are readily prepared using conventional excipients and extending agents known in the art. It will be understood by those skilled in the art that other active therapeutic ingredients can be included in the novel compositions of this invention.

The compositions of this invention can be administered either intermittently for isolated episodes of pain, or on a regular basis (i.e., every 4 to 6 hours) when pain persists over a period of time.

The following examples illustrate the present invention.

EXAMPLE 1

A typical composition suitable for filling into gelatin capsules is prepared by thoroughly mixing 1 part by weight of α-d-propoxyphene hydrochloride, 5 parts by weight of namoxyrate and 2 parts by weight of starch. The mixture is filled into No. 2 gelatin capsules in an amount such that each finished capsule contains about 32 mg. of α-d-propoxyphene hydrochloride and about 160 mg. of namoxyrate.

If desired, the foregoing composition can be made to contain, in addition, about 10 parts by weight of acetylsalicylic acid, in which case each capsule will also contain about 320 mg. of acetylsalicylic acid.

EXAMPLE 2

α-d-Propoxyphene hydrochloride and namoxyrate were evaluated separately and jointly in rats in a test mehod in which the reaction time of treated and untreated rats to the application of a heat stimulus to the rat tail was used to indicate the degree of analgesia. The test method employed is that described by Robbins (Journal of the American Pharmaceutical Association, Vol. 44 page 479 (1955)).

Female Harlan strain albino rats, weighing between 70 and 80 grams, were fasted overnight prior to testing. Doses of 8 mg./kg. of α-d-propoxyphene hydrochloride were administered subcutaneously to groups of four rats. Rats in some dose groups additionally received a subcutaneous dose of namoxyrate at 20, 40, 80, or 160 mg./kg. Additional groups of four rats received either α-d-propoxyphene hydrochloride or namoxyrate alone, or saline solution. Pain reaction times were determined in the rat tail heat test at 30 and 60 minutes after treatment, and compared with saline treated control rats. A maximum cutoff time of 15 seconds was used to avoid damaging the rats' tails. Subcutaneous doses of namoxyrate at 160 mg./kg. produced pain reaction times which were indistinguishable from the control values. However, as little as 20 mg./kg. of namoxyrate enhanced the level of analgesia obtained with α-d-propoxyphene hydrochloride.

The test results are summarized in the following table:

| Substances administered | Pain reaction time (seconds) after— | |
|---|---|---|
| | 30 min. | 60 min. |
| Saline | 4.25 | 4.0 |
| α-d-Propoxyphene hydrochloride, 8 mg./kg. | 8.70 | 7.5 |
| Namoxyrate, 160 mg./kg. | 4.60 | 4.3 |
| 8 mg./kg. α-d-propoxyphene hydrochloride plus 20 mg./kg. namoxyrate | 9.44 | 8.06 |
| 8 mg./kg. α-d-propoxyphene hydrochloride plus 40 mg./kg. namoxyrate | 10.88 | 8.38 |
| 8 mg./kg. α-d-propoxyphene hydrochloride plus 80 mg./kg. namoxyrate | 13.75 | 9.81 |
| 8 mg./kg. α-d-propoxyphene hydrochloride plus 160 mg./kg. namoxyrate | >15.00 | 12.75 |

At 160 mg./kg., namoxyrate demonstrated no analgesic activity. However, when as little as 20 mg./kg. was combined with α-d-propoxyphene hydrochloride, the analgesic activity of α-d-propoxyphene hydrochloride was enhanced. At doses of from 40 to 160 mg./kg., namoxyrate greatly enhances the analgesic activity of α-d-propoxyphene hydrochloride to that approaching and exceeding the level of activity obtained with an analgesically effective amount of morphine.

I claim:
1. An analgesic composition comprising, in combination, one part by weight, as the free base, of a first compound which is α-d-propoxyphene or a pharmaceutically acceptable acid addition salt thereof; and from 1 to 25 parts by weight of a second compound, namoxyrate.
2. A composition according to claim 1 wherein said first compound is α-d-propoxyphene hydrochloride.
3. A composition according to claim 1 wherein said first compound is α-d-propoxyphene napsylate.
4. The method which comprises administering to a warm-blooded mammal a composition of claim 1.
5. The method of claim 4 wherein the first compound is α-d-propoxyphene hydrochloride.
6. The method of claim 4 wherein the first compound is α-d-propoxyphene napsylate.

References Cited

UNITED STATES PATENTS

| 2,728,779 | 12/1955 | Pohland | 260—326.5 |
| 3,181,994 | 5/1965 | Dubnick | 424—267 |
| 3,439,094 | 4/1969 | Emele | 424—253 |

OTHER REFERENCES

American Drug Index (1968), p. 173.

STANLEY J. FRIEDMAN, Primary Examiner

U.S. Cl. X.R.

424—316